J. G. PIKE.
Churn.
No. 719.
Patented April 28, 1838.
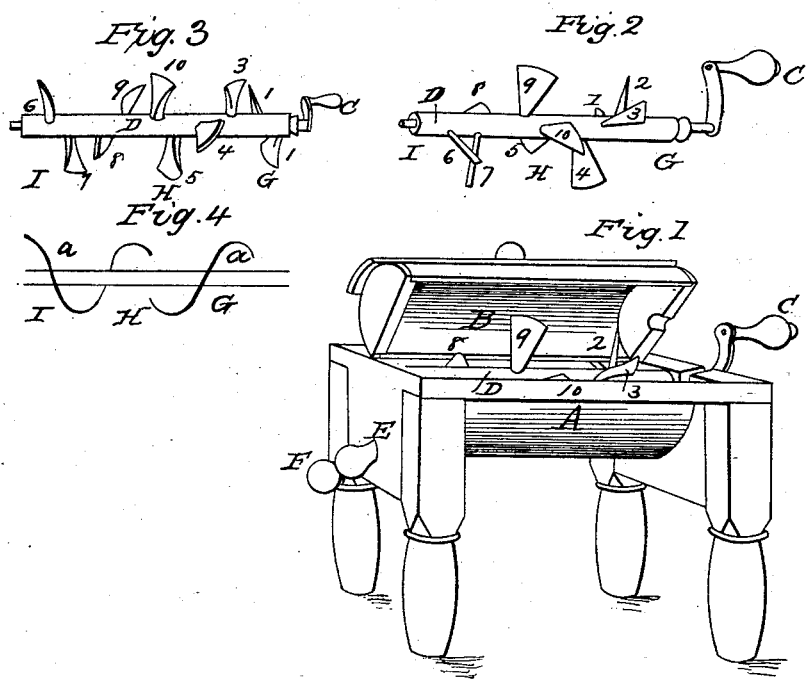

UNITED STATES PATENT OFFICE.

JOSHUA G. PIKE, OF LISBON, NEW YORK.

CHURN.

Specification of Letters Patent No. 719, dated April 28, 1838.

*To all whom it may concern:*

Be it known that I, JOSHUA G. PIKE, of Lisbon, in the county of St. Lawrence and State of New York, have invented a new and useful Machine for Churning and Working Butter; and I do hereby declare that the following is a full and exact description.

The nature of my invention consists in inserting oblique paddles into a horizontal shaft which is made to revolve in a hollow cylindrical vessel containing the cream or milk, the said paddles being so arranged that by turning the shaft in one direction the butter will be collected into one place in the center of the churn and thus separated from the whey while by reversing the motion it will be again spread over the internal surface of the cylinder and prepared for salting.

To enable others skilled in the art to make and use my invention I will proceed to describe its construction and operation.

Figure 1 in the annexed drawing represents the machine in all its parts. A represents the lower half of the cylindrical vessel containing the cream or milk; B its upper half constituting the cover which is here elevated at an angle of 45 degrees; C the handle or crank by which the revolving shaft is turned; D the revolving shaft; 1, 2, 3, &c., the paddles set in the revolving shaft; E the spout by which the whey is discharged on removing the plug F.

In using the machine the cream or milk is placed in the cylinder and the handle, C, turned forward causing the shaft and paddles to revolve until the butter is formed. When formed the butter is successively struck by the paddles 1, 2, 3, 4 and 5, (see Figs. 2 and 3) in their revolution and by their oblique position moved toward the center of the churn from G to H. At the same time and by the same operation the paddles 6, 7, 8, 9 and 10 sloping in the opposite direction from those first mentioned move the butter in the opposite direction viz. from I to H. The direction of the paddles is represented by the lines $a$, $a$, in Fig. 4. By this process the butter is collected in the center of the churn and thus separated from the whey which is discharged from the spout E. If the shaft and paddles are now turned backward or in a direction opposite to that by which the butter was collected the butter will be again spread over the internal surface of the cylinder and prepared for salting. After applying the salt the shaft is turned backward and forward alternately and this by giving a horizontal and a rotary motion to the butter thoroughly separates the whey and mixes the salt with the butter and thus saves the labor of working and salting by any of the modes now in use.

What I claim as my invention and desire to secure by Letters Patent is—

The placing of the paddles around the shaft so that they shall direct the cream and butter from each end toward the center, or from the center toward each end, in the manner and for the purpose set forth.

JOSHUA G. PIKE.

Witnesses:
BENJN. REEVE,
R. W. JUDSON.